United States Patent
Wang

(10) Patent No.: US 7,293,914 B2
(45) Date of Patent: Nov. 13, 2007

(54) TEMPERATURE DETECTING HEATER WITH INDICATING STRUCTURE FOR AQUARIUM

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 84 days.

(21) Appl. No.: 11/260,404

(22) Filed: Oct. 28, 2005

(65) Prior Publication Data

US 2007/0098043 A1  May 3, 2007

(51) Int. Cl.
*G01K 1/00* (2006.01)
*G01K 13/00* (2006.01)
*H05B 1/00* (2006.01)
*F24H 1/00* (2006.01)

(52) U.S. Cl. .................. 374/141; 374/208; 374/148; 392/441; 219/510

(58) Field of Classification Search ............. 374/141, 374/147, 148, 150, 208; 392/497, 498, 501, 392/478, 441
See application file for complete search history.

(56) References Cited

U.S. PATENT DOCUMENTS

| | | | | |
|---|---|---|---|---|
| 3,737,621 A * | 6/1973 | Elkins | .............. | 392/498 |
| 3,896,289 A * | 7/1975 | Di Renna | .............. | 219/523 |
| 4,124,793 A * | 11/1978 | Colman | .............. | 219/523 |
| 4,378,488 A * | 3/1983 | Jager | .............. | 219/523 |
| 4,418,339 A * | 11/1983 | Spofford et al. | .............. | 340/595 |
| 4,812,626 A * | 3/1989 | Strada | .............. | 219/523 |
| 4,975,562 A * | 12/1990 | Friedman | .............. | 219/523 |
| 4,983,813 A * | 1/1991 | Van Tulleken et al. | .............. | 219/523 |
| 4,994,792 A * | 2/1991 | Ziegler, Jr. | .............. | 340/584 |
| 5,392,380 A * | 2/1995 | Tsai | .............. | 392/498 |
| 5,568,587 A * | 10/1996 | Marioni | .............. | 392/498 |
| 6,393,213 B1 * | 5/2002 | Bresolin | .............. | 392/498 |
| 6,455,820 B2 * | 9/2002 | Bradenbaugh | .............. | 219/481 |
| 6,658,205 B1 * | 12/2003 | Wang | .............. | 392/498 |
| 7,046,923 B2 * | 5/2006 | Magri | .............. | 392/497 |
| 7,049,554 B2 * | 5/2006 | Lolato | .............. | 219/523 |
| 7,085,482 B2 * | 8/2006 | Renoud-Grappin | .............. | 392/478 |
| 2001/0046380 A1 * | 11/2001 | LeFebvre | .............. | 392/501 |
| 2005/0242080 A1 * | 11/2005 | Magri | .............. | 219/523 |
| 2007/0019709 A1 * | 1/2007 | Wang | .............. | 374/208 |

FOREIGN PATENT DOCUMENTS

EP 0543655 A1 * 11/2002

* cited by examiner

*Primary Examiner*—Gail Verbitsky

(57) ABSTRACT

A temperature detecting heater with an indicating structure for an aquarium, the temperature detecting heater mainly has an indicating structure including a control circuit and a two-color LED indicating lamp in its circuitry. After the temperature detecting heater is turned on, temperature detectors of the control circuit detects a voltage to compare it with a reference voltage at a set point; when the temperature at the detected point is lower than that of the set point, a heating element of the temperature detecting heater is controlled to work normally and makes the LED indicating lamp show a first color, for instance, red; but when the temperature at the detected point is higher than that of the set point, the heating element of the temperature detecting heater is controlled to stop working and makes the LED indicating lamp show a second color, for instance, green. By emitting light showing two different colors from the two-color LED indicating lamp of the indicating structure, a user can clearly know whether the heating function of the temperature detecting heater is normal.

7 Claims, 4 Drawing Sheets

US 7,293,914 B2

TEMPERATURE DETECTING HEATER WITH INDICATING STRUCTURE FOR AQUARIUM

BACKGROUND OF THE INVENTION

1. Field of the Invention

The present invention is related to a temperature detecting heater for an aquarium, and especially to a temperature detecting heater with an indicating structure for an aquarium with which a user can see whether the heating function of the temperature detecting heater is normal.

2. Description of the Prior Art

In an aquarium such as one for fishes, to prevent the temperature of water from being overly low, generally a temperature detecting heater is used to control the temperature of the water. A conventional temperature detecting heater mainly has a heating element and a temperature detecting element for detecting the temperature of water. When the temperature of water is overly low, the heating element is activated to emit heat to increase the temperature of the water; while if the temperature reaches a set value, the heating element is turned off to stop heat generating.

A heating element of a conventional temperature detecting heater is provided in a glass tube with an electric power indicating lamp. When the temperature detecting heater is turned on, the electric power indicating lamp is lightened to show that the temperature detecting heater is activated. Such a conventional structure is unable to let know whether the temperature detecting heater has been damaged or not, sometimes a danger of being overheated may happen, thereby improvement is required.

SUMMARY OF THE INVENTION

In view that the conventional temperature detecting heater does not have an indicating structure to show whether it has been damaged or not, the present invention mainly provides a control circuit and a two-color LED indicating lamp functioning as an indicating structure in the circuitry of a temperature detecting heater. After the temperature detecting heater is turned on, a plurality of temperature detectors of the control circuit detects a voltage to compare it with a reference voltage at a set point; when the temperature at the detected point is lower than that of the set point, a heating element of the temperature detecting heater is controlled to work normally and makes the LED indicating lamp show a first color, for instance, red; but when the temperature at the detected point is higher than that of the set point, the heating element of the temperature detecting heater is controlled to stop working and makes the LED indicating lamp show a second color, for instance, green. By emitting light showing two different colors from the two-color LED indicating lamp of the indicating structure, a user can clearly know whether the heating function of the temperature detecting heater is normal.

The present invention will be apparent in its structural features and functions in operation after reading the detailed description of the preferred embodiments thereof in reference to the accompanying drawings.

DETAILED DESCRIPTION OF THE PREFERRED EMBODIMENT

Figure 1:
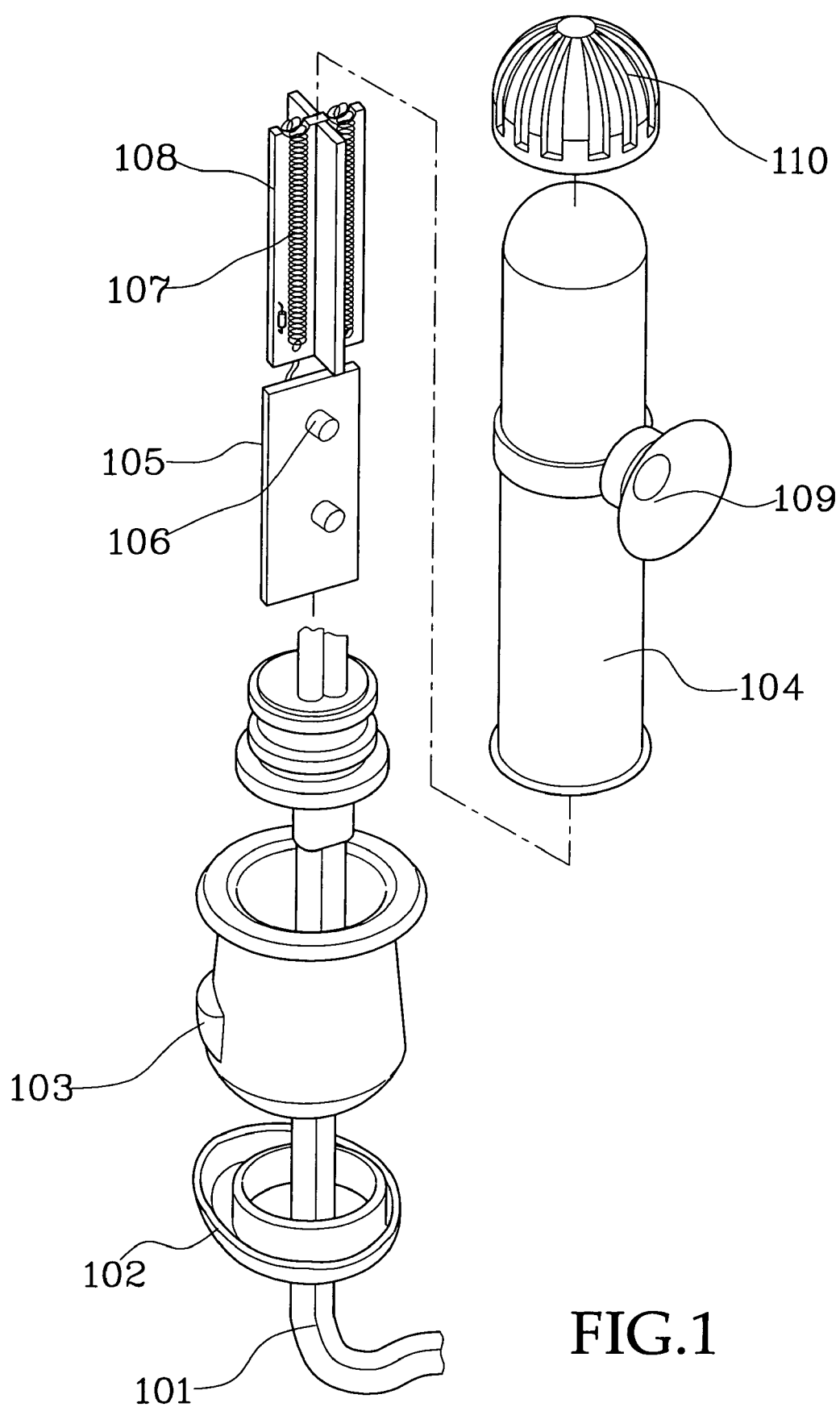
FIG. 1 is an anatomic perspective view showing a temperature detecting heater of the present invention.

Referring to FIG. 1 which is an anatomic perspective view showing a temperature detecting heater of the present invention, the temperature detecting heater has a power line 101 extending through a top housing composed of an upper cover 102 and a lower cover 103 into a glass tube 104, the power line 101 is connected with a printed circuit board 105 to supply electric power. The printed circuit board 105 is provided with a two-color LED indicating lamp 106, and is connected with a mica plate 108 provided with a heating element 107. The printed circuit board 105 and the heating element 107 are provided in the glass tube 104, in order that the LED indicating lamp 106 emits two different kinds of colors to be seen by a user through the glass tube 104.

The top housing and the glass tube 104 are assembled to seal the printed circuit board 105 and the heating element 107 to prevent water from flowing in.

And more, the glass tube 104 is provided thereon with a suction cap 109 to suck the entire temperature detecting heater on the wall of the aquarium. The glass tube 104 is provided on its bottom with a bumper 110.

The present invention mainly provides an indicating structure on the temperature detecting heater which includes a control circuit and a two-color LED indicating lamp 106.

Figure 2:
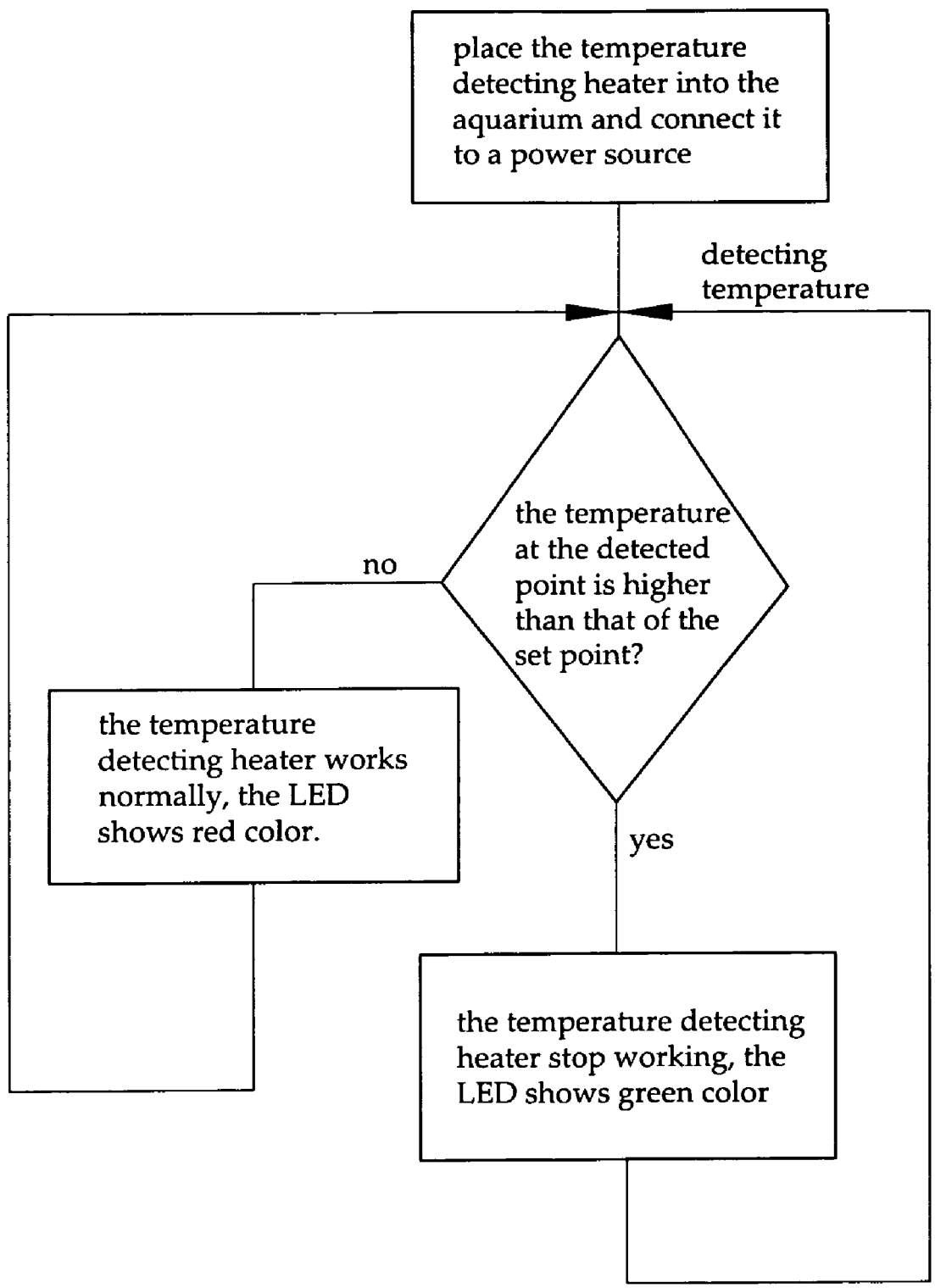
FIG. 2 is a flow chart of operation of the temperature detecting heater of the present invention.

Referring to FIG. 2 which is a flow chart of operation of the temperature detecting heater of the present invention, when the temperature detecting heater gets electric power through a power line 101, temperature detectors in the control circuit detects a voltage generated in corresponding to a detected temperature of water to compare it with a reference voltage generated in corresponding to a preset temperature at a set point; when the temperature at the detected point is lower than that of the set point, the heating element 107 of the temperature detecting heater is controlled to work normally and makes the LED indicating lamp 106 show a first color, for instance, red; but when the temperature at the detected point is higher than that of the set point, the heating element 107 of the temperature detecting heater is controlled to stop working and makes the LED indicating lamp 106 show a second color, for instance, green. By emitting light showing two different colors from the two-color LED indicating lamp 106 of the indicating structure, a user can clearly know whether the heating function of the temperature detecting heater is normal.

Figure 3:
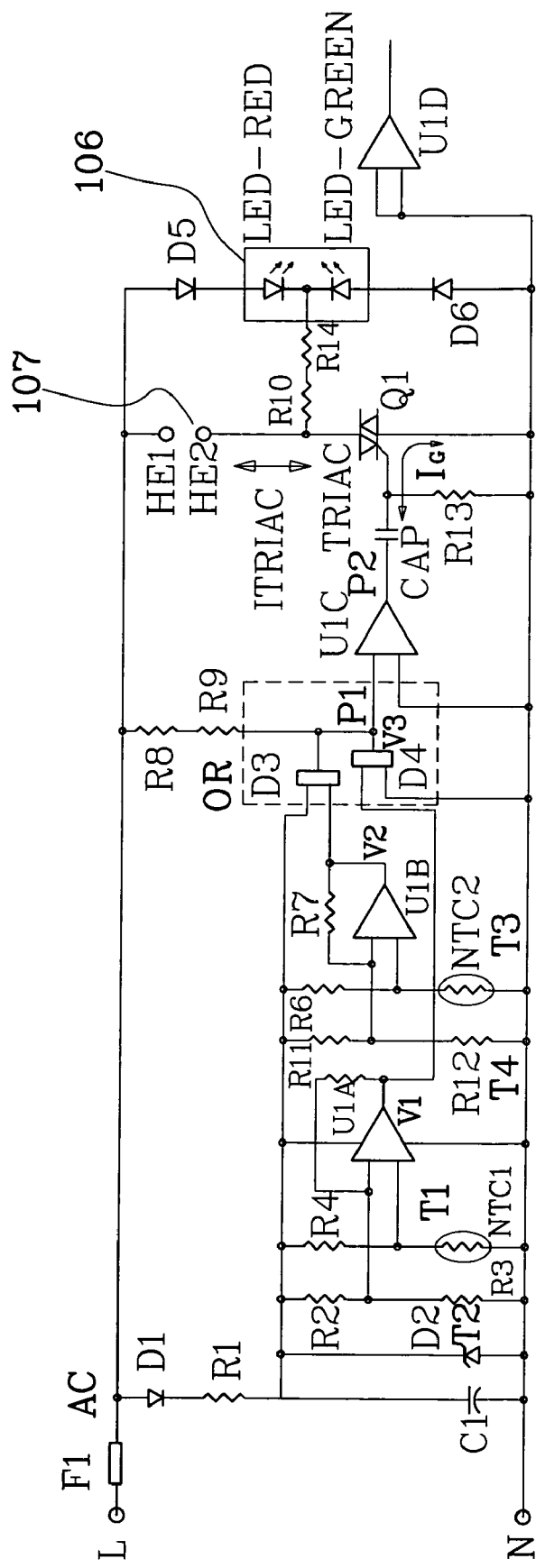
FIG. 3 is a circuit diagram of a control circuit of the present invention.

Referring to FIG. 3 which is a circuit diagram of a control circuit of the present invention, in the control circuit there are two temperature detectors NTC1 and NTC2, wherein the NTC1 is a water temperature detector, it controls water temperature during the water is heated to avoid overly high temperature; while the NTC2 is a temperature detector used in dry electric heating for protecting the circuit during heating, and to avoid overly high temperature when in heating without water. A first comparator U1A is used to compare a voltage generated in corresponding to a detected temperature T1 of water with a voltage generated in corresponding to a preset temperature T2; a second comparator U1B is used to compare a voltage generated in corresponding to a detected temperature T3 in electric heating with a voltage generated in corresponding to a preset temperature T4. The first comparator U1A and the second comparator U1B output signals V1 and V2 to an OR gate; a third comparator U1C which is a square wave generator compares an output signal V3 of the OR gate with a signal at a negative input terminal of the third comparator U1C. A coupling capacitor CAP is used to receive an output signal of the third comparator U1C to couple with an alternating signal to activate a triac. The triac controls heating of the heating element 107 when the triac is triggered, and the two-color LED indicating lamp 106 emits light of the first color, for instance, red; and the heating element 107 does not emit heat when the triac is not triggered, and the two-color LED indicating lamp 106 emits light of the second color, for instance, green.

Figure 4:
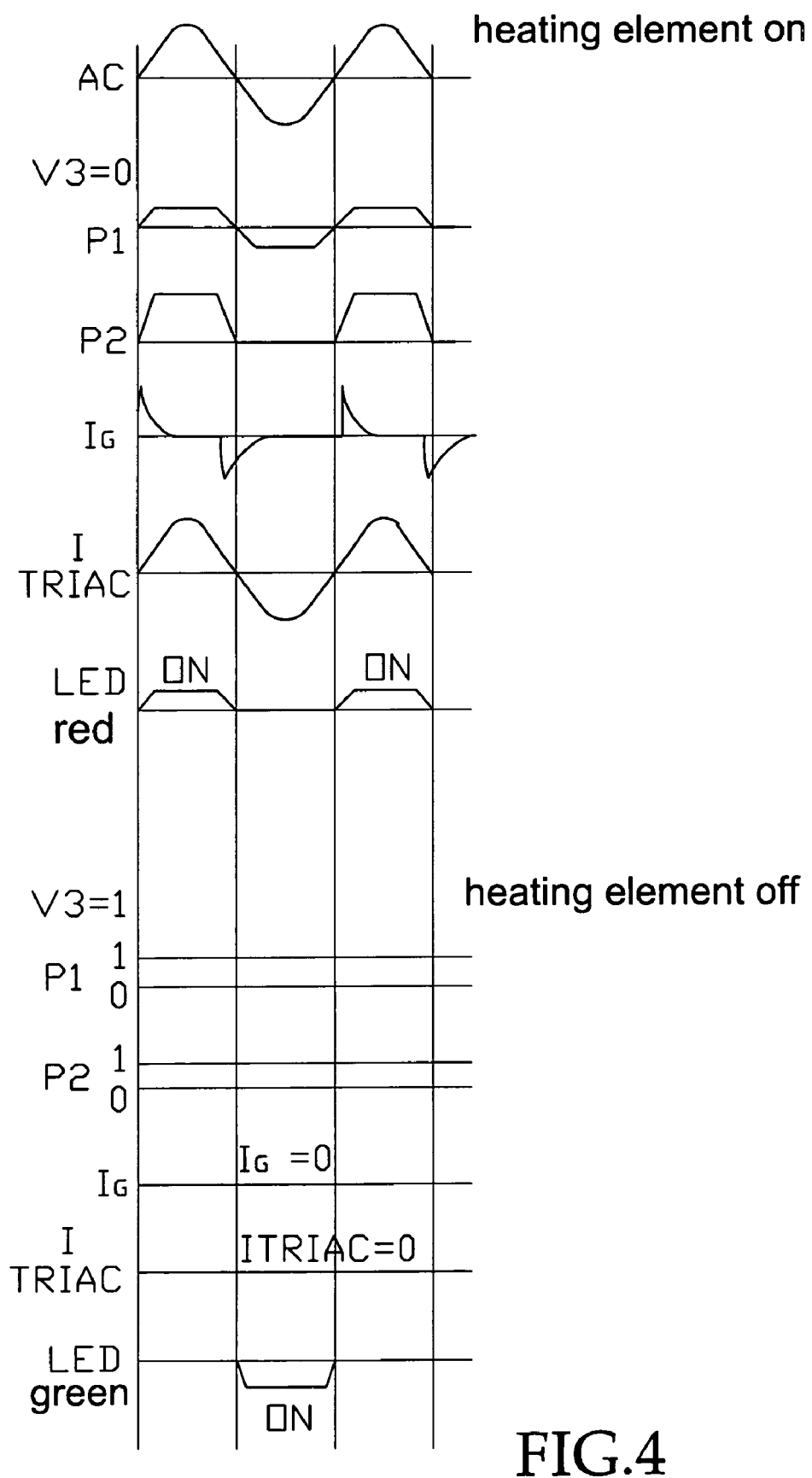
FIG. 4 is a diagram showing the wave form of FIG. 3.

Referring to FIG. 3 and the wave form of FIG. 4, the drawings illustrate the action of controlling the circuit. The temperature detecting heater is inserted therein with a power line to supply it with an alternative current of 120 V AC and 60 Hz which is turned into a DC current of 12 V via a rectifying and voltage stabilizing loop; at this time, the temperature detectors NTC1 and NTC2 simultaneously detect a voltage to compare it with a reference voltage at a set point; when the voltages at the two detected points are both higher than the reference voltage, the first comparator U1A and the second comparator U1B output signals V1 and V2 of low potentials, meantime an input pin P1 of the third comparator U1C is not controlled by the first comparator U1A and the second comparator U1B, the signal V3 is an alternating signal changing in pursuance of the change of the frequency of an electric power source; this signal is compared with the signal at the negative input terminal of the third comparator U1C, and outputs a square wave signal changing in pursuance of the change of the frequency of the electric power source to be coupled by the coupling capacitor CAP with an alternating signal to activate the triac, thus the triac is turned on and controls the heating element 107 for heating, and makes the LED indicating lamp 106 show the first color (red); when an output voltage of the first comparator U1A or the second comparator U1B is lower than the reference voltage, and the input pin P1 of the third comparator U1C is at a high potential, the output pin P2 of the third comparator U1C is at a high potential too, coupling with the coupling capacitor CAP is unable to give a signal to activate the triac, thereby the triac is not turned on, and the heating element 107 does not do heating, this makes the LED indicating lamp 106 show the second color (green).

Obviously, the temperature detecting heater of the present invention has an indicating structure, with which heating of the temperature detecting heater renders the LED indicating lamp 106 to display a first color of a second color (red or green) to give an indication; and a user can clearly know whether the heating function of the temperature detecting heater is normal, this is more improved upon the conventional technique.

When in practical using, an electric power line 101 is inserted into a socket to get power, the LED indicating lamp 106 will firstly show green light, this means that the power is getting through the heating element 107; when the heating element 107 starts heating, the LED indicating lamp 106 will be turned from the green light to red light, this means that the heating element 107 is heating. But when heating to get the preset temperature, namely when the heating is completed, the LED indicating lamp 106 will be turned from the red light to the green light, this means that the heating function of the temperature detecting heater is normal.

The temperature detecting heater with an indicating structure for an aquarium for the present invention takes advantage of color changing of the LED indicating lamp 106 in the indicating structure, and we can clearly know whether the heating function is normal; this is more improved upon the conventional technique.

Having thus described the temperature detecting heater with an indicating structure for an aquarium for the present invention, my invention is to be construed as including all modifications and variations falling within the scope of the appended claims.

The invention claimed is:

1. A temperature detecting heater with an indicating structure for an aquarium, said temperature detecting heater has an electric power line extending through a top housing into a glass tube, said power line is connected with a printed circuit board to supply electric power; said printed circuit board is connected with a mica plate provided with a heating element, said printed circuit board and said heating element are sealed after assembling of said top housing with said glass tube; and an indicating structure is provided on said temperature detecting heater, said indicating structure includes a control circuit and a two-color LED indicating lamp, after said temperature detecting heater is turned on, a plurality of temperature detectors of said control circuit detecting a voltage generated and corresponding to a detected temperature of water to compare the detected temperature with a reference voltage generated in corresponding to a preset temperature at a set point; when said detected temperature at a detected point is lower than that of said set point, a heating element of said temperature detecting heater is controlled to work normally and makes said LED indicating lamp emits light with a first color; when said detected temperature at said detected point is higher than that of said set point, said heating element is controlled to stop working and makes said LED indicating lamp emits light with a second color, wherein amount of said temperature detectors in said control circuit is two, one of said temperature detectors is one used in dry electric heating for protecting a circuit during heating, while the other one is a water temperature detector to avoid overly high temperature of water, wherein said control circuit has a first comparator to compare a voltage generated in corresponding to a detected temperature of water with a voltage generated in corresponding to a preset temperature, and a second comparator to compare a voltage generated in corresponding to a detected temperature in electric heating with a voltage generated in corresponding to another preset temperature; said first comparator and said second comparator output signals to an OR gate; a third comparator compares an output signal of said OR gate with a signal at a negative input terminal of said third comparator; a coupling capacitor CAP is used to receive an output signal of said third comparator to couple with an alternating signal to activate a triac, said triac controls heating of said heating element when said triac is triggered, and said two-color LED indicating lamp emits light of said first color; and said heating element does not emit heat when said triac is not triggered, and said LED indicating lamp emits light of said second color.

2. The temperature detecting heater with an indicating structure for an aquarium as claimed in claim 1, wherein said first color of said LED indicating lamp is red.

3. The temperature detecting heater with an indicating structure for an aquarium as claimed in claim 1, wherein said second color of said LED indicating lamp is green.

4. The temperature detecting heater with an indicating structure for an aquarium as claimed in claim 1, wherein said LED indicating lamp is provided on said printed circuit board, said first or and second color of light penetrates out of a glass tube.

5. The temperature detecting heater with an indicating structure for an aquarium as claimed in claim 1, wherein said third comparator is a square wave generator.

6. The temperature detecting heater with an indicating structure for an aquarium as claimed in claim 1, wherein said glass tube is provided thereon with a suction cap.

7. The temperature detecting heater with an indicating structure for an aquarium as claimed in claim 1, wherein said glass tube is provided on its bottom with a bumper.

* * * * *